United States Patent [19]

Tondreau

[11] 3,967,638
[45] July 6, 1976

[54] COMBINATION FAUCET AND AIR GAP

[75] Inventor: Raymond A. Tondreau, San Marcos, Calif.

[73] Assignee: Desalination Systems, Inc., Escondido, Calif.

[22] Filed: Aug. 6, 1975

[21] Appl. No.: 602,193

[52] U.S. Cl. .......................... 137/216; 210/321 R; 210/433 M; 210/449; 210/257 M
[51] Int. Cl.² ................................................. F16K 24/00
[58] Field of Search ........................ 137/216, 375; 210/257 M, 321 R, 433 M, 449

[56] References Cited
UNITED STATES PATENTS

| | | | |
|---|---|---|---|
| 3,620,241 | 11/1971 | Brown | 137/216 |
| 3,794,172 | 2/1974 | Bray | 210/257 M |

*Primary Examiner*—Henry T. Klinksiek
*Attorney, Agent, or Firm*—Clement H. Allen

[57] ABSTRACT

A combination faucet and antisyphon break or air gap for dispensing purified water produced by a membrane type purification unit, has a body having a valve-controlled passage with a spout for dispensing purified water; and a pair of additional vertical passages, one for connection to the brine output of the purification unit and the other for connection to the sewer. The passage connected to the brine output of the purification unit comprises a plastic tube which terminates at its top in a gooseneck, which acts as a channel to direct the brine overflow from this passage past an antisyphon break into the passage connected to the sewer. This passage also comprises a plastic tube.

6 Claims, 7 Drawing Figures

U.S. Patent   July 6, 1976   3,967,638
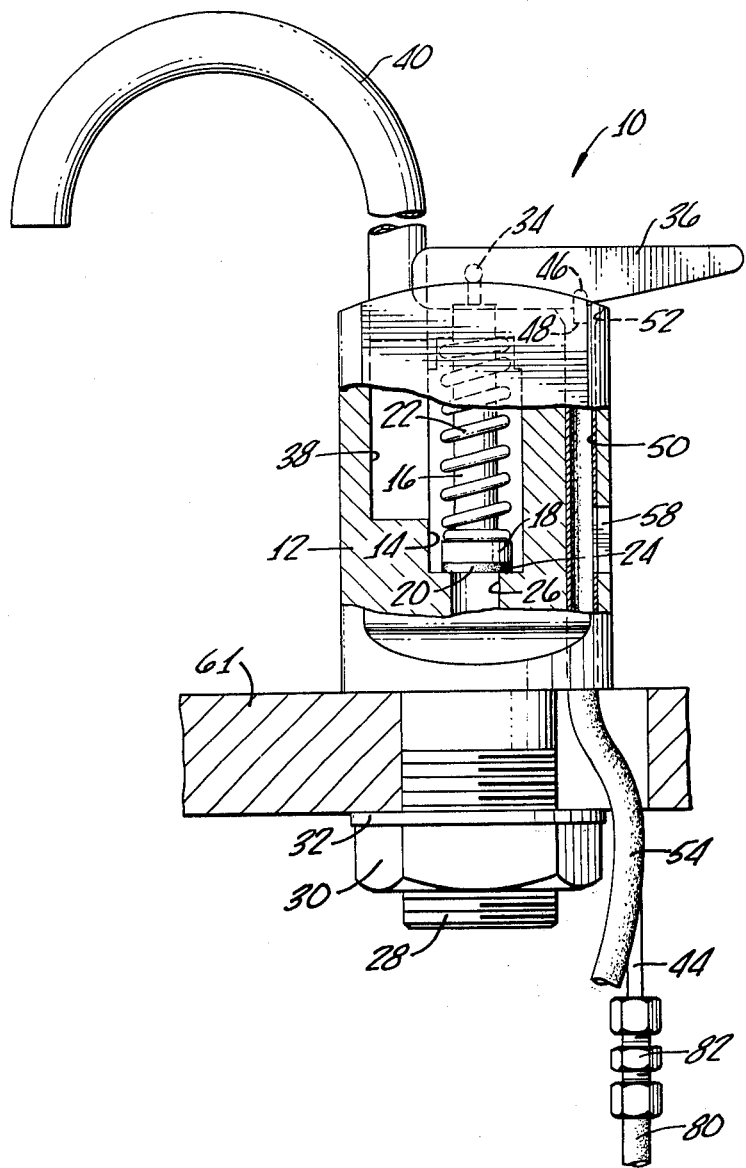
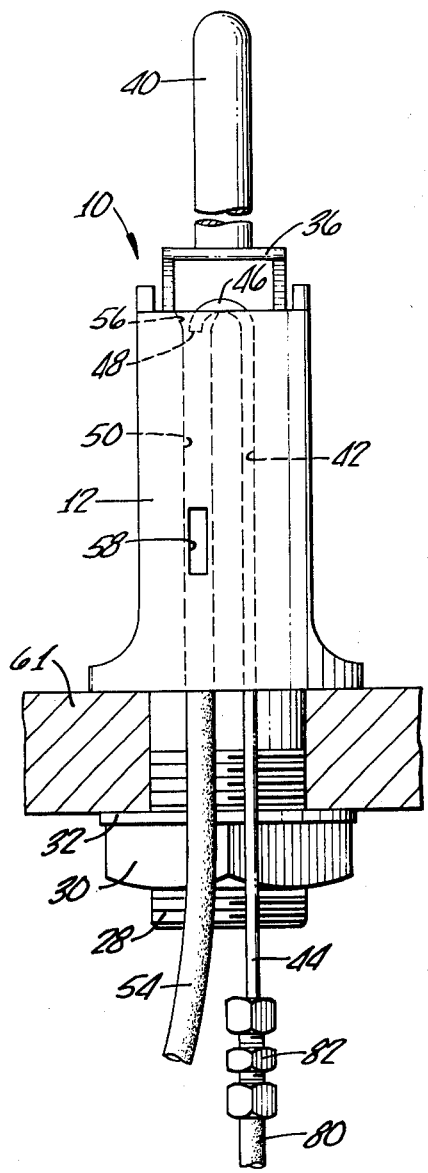
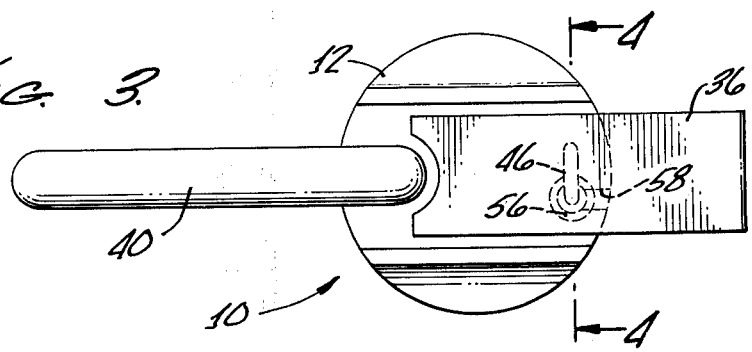

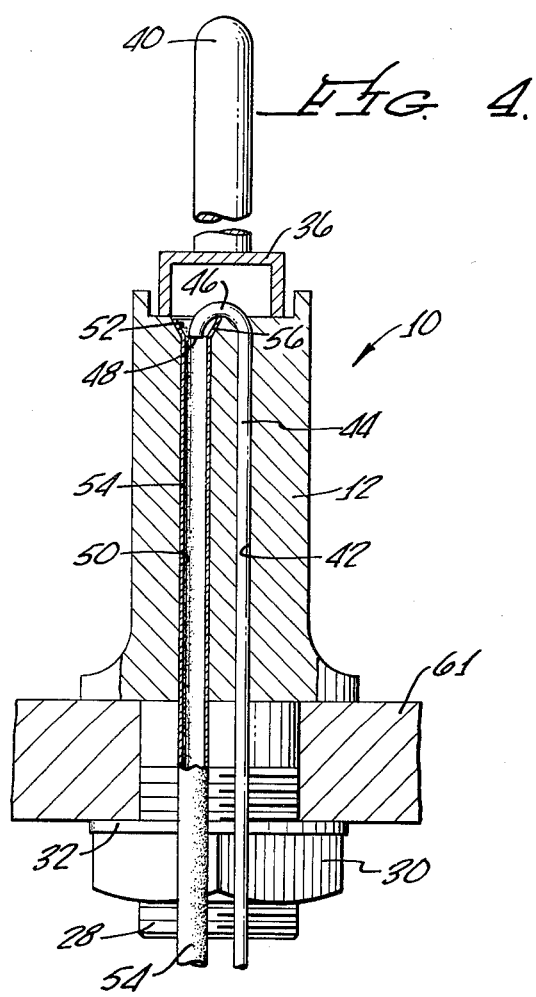
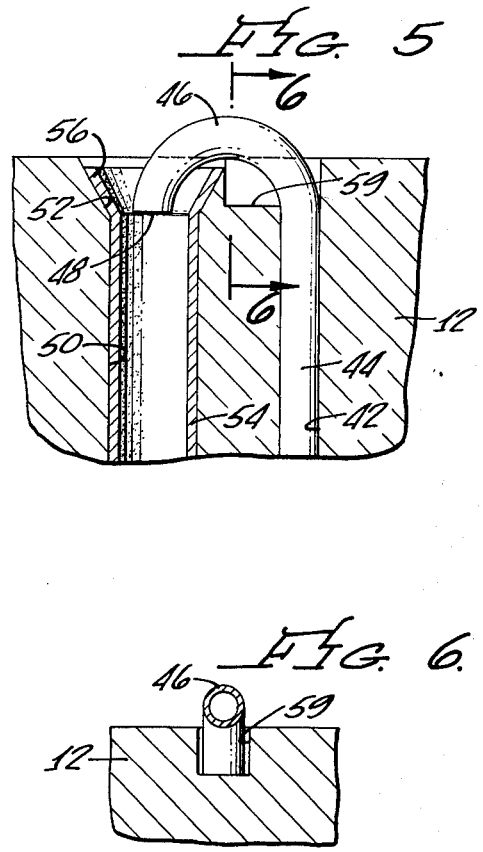
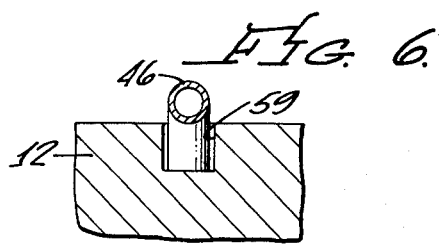
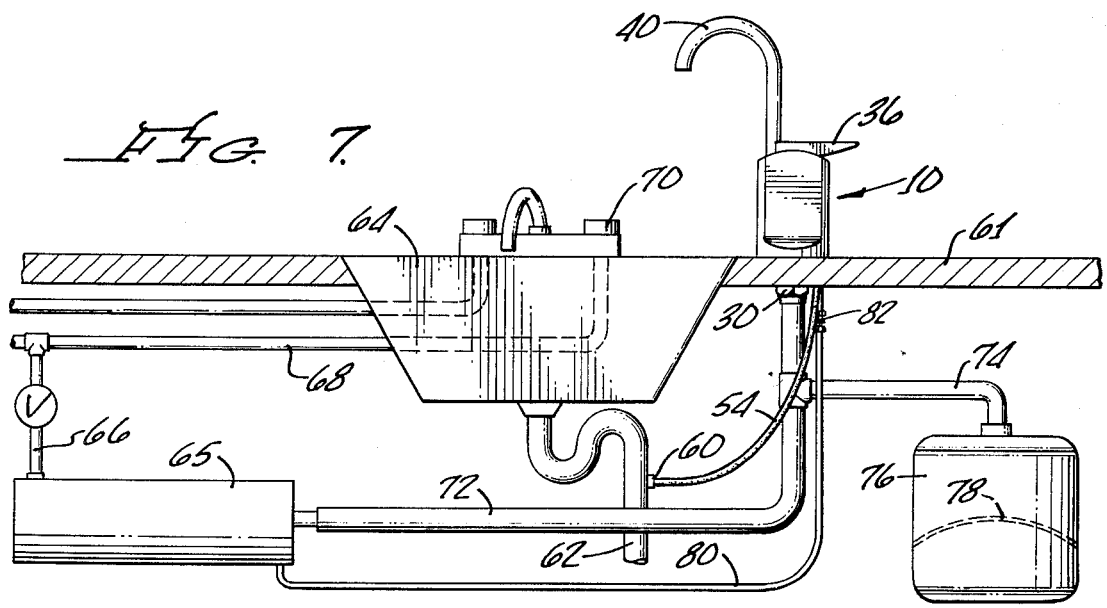

COMBINATION FAUCET AND AIR GAP

BACKGROUND OF THE INVENTION

1. The Field of the Invention

This invention relates to a combination faucet and antisyphon break fixture for use with a small reverse osmosis system producing purified water for household use.

2. The Prior Art

Small water purification systems employing a desalination unit operating by reverse osmosis and designed to produce a few gallons of water a day for household use, often hold purified water in a pressurized storage tank and dispense this water as required through a suitable faucet. Such reverse osmosis purification units, however, also produce a flow of waste by-product water or brine, which is high in salt content and is disposed of through connection to a sewer system.

In order to dispose of the brine, laws and ordinances often require that such sewer connection be provided with an adequate antisyphon break or air gap that will positively prevent the possibility of sewage being syphoned back into the reverse osmosis brine connection and thus to the water line leading to the reverse osmosis unit, and to the water supply being purified. An air gap of at least one inch in the drain line, and at a specified height, is a common requirement, and suitable air gap fixtures are available for mounting on a sink or drain board, usually spaced apart from the faucet that supplies purified water.

To avoid the expense and inconvenience of a separate air gap fixture, faucets of a type suitable for the purpose may be provided with an integral air gap as described in U.S. Pat. No. 3,620,241, issued Nov. 16, 1971. Such combination faucet and air gap fixtures operate effectively when first installed, but after a period of use may require frequent servicing, repair and sometimes replacement, caused principally by the corrosive nature of the brine flowing through the brine ducts and air gap system. Contact of the highly saline brine with any metal surfaces in the faucet fixture has resulted in corrosion and erosion of such surfaces, and formation of a hard deposit or crust of salts and corrosion products which at times can partly or even wholly obstruct brine flow passages, and may even affect the functioning of the air gap itself.

A combination faucet and antisyphon break or air gap fixture which would be immune from brine corrosion effects would be a substantial improvement.

SUMMARY OF THE INVENTION

This invention comprises a combination faucet and antisyphon break fixture comprising a metallic body having a valve-controlled passage with a spout for dispensing purified water, as from a reverse osmosis water purifying unit. The body also has a second passage in the form of a plastic tube for introducing brine from a reverse osmosis water purifier upwardly into the fixture body, and a third passage in the form of a plastic tube for releasing the brine from the fixture body to a sewer or other disposal. Brine is directed from the top of the second passage by a channel, such as a gooseneck, carrying the overflow from the top of the second passage past an antisyphon break or vent, into the third passage in the fixture body.

The plastic tubes comprising the second and third passages in the fixture body are preferably fabricated of nylon plastic. The outlet of the gooseneck at the top of the second passage tube is releasably seated in a groove in the top of the fixture body to align its outlet centrally over the third passage tube, which is preferably fixedly attached to the interior wall of a bore in said fixture body, as by an epoxy adhesive.

BRIEF DESCRIPTION OF THE DRAWINGS

In the drawings:

FIG. 1 is a side view, partly broken out, of a combination faucet and antisyphon break fixture embodying features of this invention.

FIG. 2 is an end view of the combination faucet and antisyphon break fixture of FIG. 1.

FIG. 3 is a top view of the combination faucet and antisyphon break fixture of FIG. 1.

FIG. 4 is a vertical section of the combination faucet and antisyphon break fixture taken along the line 4—4 of FIG. 3.

FIG. 5 is an enlarged fragmentary view of the combination faucet and antisyphon break fixture showing the positioning groove for the brine tube gooseneck.

FIG. 6 is a vertical cross section of the view of FIG. 5 taken along the line 6—6.

FIG. 7 illustrates the combination faucet and antisyphon break fixture connected into a reverse osmosis system for supplying purified water.

DESCRIPTION OF A PREFERRED EMBODIMENT

Referring now to FIGS. 1 to 4, the combination faucet and air gap fixture 10 comprises a body 12 having a valve-controlled passage comprising an internal cavity 14 in which is arranged a valve comprising vertical rod 16 to which is attached a washer 18 faced around its bottom with resilient material 20. Rod 16 is normally urged downwardly by tension means such as encircling spring 22, which thereby maintains resilient face 20 of washer 18 normally firmly and sealingly engaged with seat 24 formed as a shoulder around a bore 26. Communicating with bore 26 at the bottom of fixture 10 is projecting threaded tube 28, by which the fixture may be mounted on a sink top or drainboard by tightening nut 30 over washer 32. At its top, rod 16 is pivotably attached as by pin 34 to handle 36, whose inner end bears against the top of fixture 10 and whose outer end may be lifted to thereby raise washer 18 off seat 24 and allow flow of water supplied under pressure through tube 28 (as hereinafter explained in detail), into side arm cavity 38 and out of delivery spout 40, which is sealingly attached thereinto.

Also in body 12 of fixture 10 is a vertical bore 42 forming a second passage, and into which is fitted a protecting plastic tube 44 whose upper end is formed into gooseneck 46 with outlet 48, which forms a plastic channel carrying overflow from plastic tube 44 into another vertical bore 50 forming a third passage. Bore 50 has a flared top 52 and into which is arranged a protecting plastic tube 54 having a flared top 56 to mate and overlay the flared top 52 of bore 50 as will be most clearly seen in FIG. 4. Plastic tubes 44 and 54 are each preferably fabricated as one piece; or may be unitary, that is may be fabricated as divided pieces glued or otherwise joined to provide an essentially one-piece, leak-proof structure.

An open slot 58 is cut into body 12 and through the adjacent wall of plastic tube 54 to ensure an appropriate air gap between the outlet 48 of brine-carrying gooseneck 46 and any possible level of liquid in plastic tube 54, which is connected to the sewer system. Tube 54 is preferably fixedly mounted in bore 50 as by attachment to the inner surface of bore 50 by a suitable adhesive such as an epoxy glue. This will preserve alignment of the corresponding slots 58 in body 12 and the adjacent wall of tube 54.

The outlet 48 of brine tube 44 is releasably aligned or positioned centrally over plastic tube 54, which has a somewhat larger internal diameter, so that brine flowing out of outlet 48 will fall freely down the center of tube 54, preferably without touching its sides. This position or alignment is normally maintained or preserved, yet may be released, by provision of means such as a notch or groove 59 in the top surface of body 12 and into which mates a lower part of gooseneck 46 of plastic tube 44, as will be seen in the enlarged detail views of FIGS. 5 and 6. Plastic tube 44 is not attached or glued to the interior wall of bore 42 so that it may be readily released by lifting gooseneck 46 up and out of groove 59, as by a suitable small tool inserted thereunder, yet when gooseneck 46 is lowered and set into groove 59, outlet 48 will be aligned centrally over plastic tube 54.

Referring now to FIG. 7, a household purified water system is shown employing the combined faucet and air gap of this invention 10 attached by tightening nut 30 to mount fixture 10 in place in a bore in a drainboard 61, sufficient clearance being provided in the borehole therethrough for passage of plastic tubes 44 and 54. Brine discharge tube 54 from fixture 10 is connected as at 60 into the drainpipe 62 leading to the sewer from sink 64. Reverse osmosis module 65 contains a conventional semipermeable membrane cartridge and is supplied with municipal water under household pressure, normally between 30 and 80 psi, through pipe 66 which is connected to pipe 68 which may also supply cold water to cold water faucet 70. Module 65 has a purified water outlet which is connected by pipe or tube 72 to threaded tube 28 of fixture 10, this pipe or tube 72 being connected also by a suitable T to pipe or tube 74 leading into the top of a storage tank 76 having top and bottom compartments separated by a flexible diaphragm 78. Air under pressure introduced into the bottom compartment of tank 76 will maintain the purified water in its top compartment pressurized for delivery through pipes 74 and 72, through threaded tube 28 and bores 14 and 38, for dispensing through spout 40 when handle 36 is raised to open the valve by raising washer 18 up from its seat 24. Reverse osmosis module 65 may contain in addition to a membrane cartridge, a flow control device such as a valve or restrictor, for example, of the type shown in U.S. Pat. No. 3,504,796, to maintain operating pressure in module 65 while releasing brine in a comparatively small flow out through tube 80. Tube 80 is connected by coupling 82 to the end of brine tube 44 depending from fixture 10 and preferably so that smaller tube 44 fits into larger tube 80, preferably also of plastic, so that a sealed sleeve joint is produced by coupling 82.

In operation of the fixture of this invention, water to be purified is introduced under elevated pressure through pipe 66 into module 65 resulting in a flow of purified water through tube 72 into storage tank 76 and to bore 26 in fixture 10, and also a flow of brine through tube 80 to tube 44 and through gooseneck 46, from where it overflows through outlet 48, which directs it into plastic tube 54 and then out through connector 60 into drain pipe 62 to the sewer. When purified water is to be dispensed from spout 40, handle 36 is raised to open the seal between washer 18 and seat 24 and allow flow of purified water from module 65 or from storage tank 76 through pipe 74. When faucet handle 36 is again lowered to shut off purified water delivery, purified water from module 65 can flow into the upper compartment of storage tank 76.

The combination faucet and air gap fixture of this invention has the advantage of a single fixture which is useful as a valve and also as an antisyphon break or air gap. The device is capable of extended use without cleaning or servicing since salts and deposits can not build up in the faucet and air gap passages. This is of critical importance, and is ensured by an organization in which the brine flowing through the fixture does not contact the body of the fixture, which is commonly fabricated of metal for strength and durability, at any point, the brine flow path being lined by plastic or plastic tubing which is not attacked or corroded by the normally corrosive brine flowing from the reverse osmosis cartridge. The brine is led into the fixture by a plastic tube 44, which has at its top a gooseneck 46 and an overflow outlet 48 over the center of the somewhat larger receiving tube 54 which is also of plastic. The free fall of brine from outlet 48 into plastic tube 54 and past air gap vent 58 precludes contact of the fixture body internal surfaces by the brine and results in long trouble-free service while maintaining an effective antisyphon break. The flared top 56 of plastic tube 54 covers and protects the flared top of bore 50 into which it fits. Plastic tube 54 being fixedly attached to the inner surface of bore 50 is prevented from rotating, and alignment of the vent 58 in the wall of tube 54 and the adjacent body section is preserved. Plastic tube 44 is prevented from rotating, and central alignment of gooseneck outlet 48 over or in tube 54 is preserved by engagement of gooseneck 46 in groove 59.

The organization wherein plastic tube 44 is releasably maintained in proper position without permanently affixing it to its bore sidewall, as is the case with plastic tube 54, is advantageous because this enables a service man, for example, to insert a small tool under gooseneck 46 to temporarily lift outlet 48 above the top of body 12 so that the brine flow out of gooseneck 46 can be observed and operation of the reverse osmosis module 65 thereby checked. Plastic tubes 44 and 54 preferably extend over the full effective length of bores 42 and 50, respectively; the effective length of bore 50 may not extend to the top of body 12, but may be considered as the length of brine fall or flow.

Tubes 44 and 54 in fixture 10 may be fabricated of any suitable plastic which is resistant to corrosion by the brine solution, has the necessary strength and rigidity and is commercially available in desired tube sizes. I have found that a relatively rigid nylon tubing is excellent for this purpose. It is strong, will withstand the corrosive effects of the brine solution, is commercially available in sizes suitable for the purpose, and may be bent into a gooseneck, and also flared, by heating and forming.

I claim:

1. A combination faucet and antisyphon break fixture which comprises; a metallic body having a valve controlled passage with a spout for dispensing purified water; a second passage in said body for introducing brine from a reverse osmosis purifier upwardly into said body; a third passage in body for releasing said brine downwardly from said body; and means for directing the flow of said brine from said second passage past an antisyphon break into said third passage; in which the improvement comprises:

a. said second passage comprising a plastic tube protecting the adjacent surface of the interior of said body from corrosive effects of said brine;

b. said third passage comprising a plastic tube protecting the adjacent surface of the interior of said body from corrosive effects of said brine; and c. said means for directing said flow of said brine from said second passage into said third passage comprising a plastic channel carrying overflow from said second passage into said third passage.

2. A combination faucet and antisyphon break fixture according to claim 1, in which said plastic channel carrying overflow from said second passage into said third passage comprises a gooseneck plastic tube attached to the top of said second passage; and means for releasably maintaining the outlet of said gooseneck aligned centrally over the open top of said third passage in said body.

3. A combination faucet and antisyphon break fixture according to claim 2, in which the means for maintaining said outlet of said gooseneck releasably aligned centrally over the top of said third passage in said body comprise a groove in a top portion of said body in which a lower part of said gooseneck seats.

4. A combination faucet and antisyphon break fixture according to claim 1, in which a top portion of said plastic tube comprising said third passage in said body is flared to mate with a flare of a corresponding bore in said body.

5. A combination faucet and antisyphon break fixture according to claim 4, in which said plastic tube comprising said third passage in said body is fixedly attached to the interior wall of a corresponding bore in said body.

6. A combination faucet and antisyphon fixture according to claim 1, in which the said plastic tubes comprising said second passage and said third passage in said body are fabricated of nylon plastic.

* * * * *